Patented Mar. 7, 1944

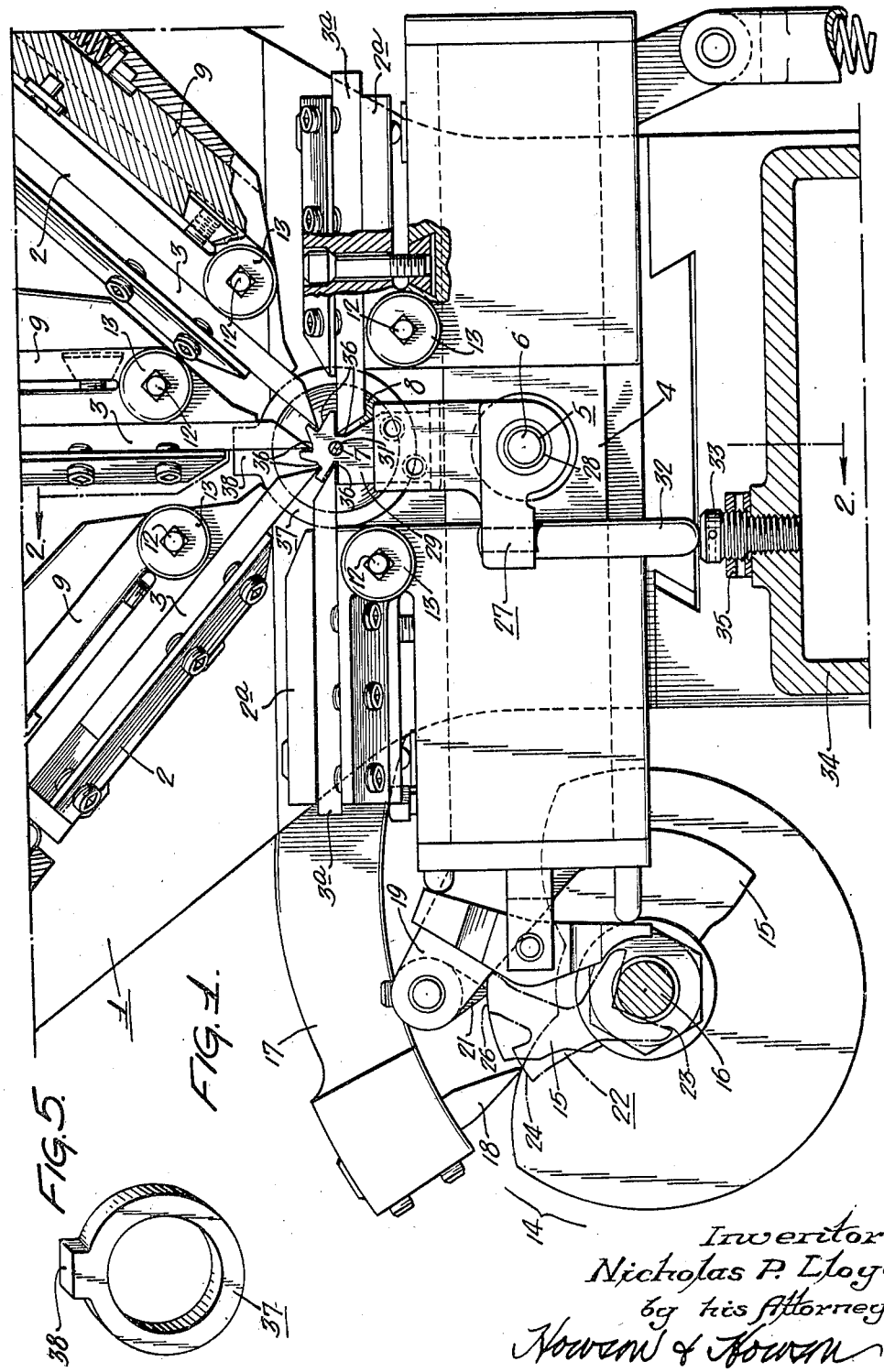

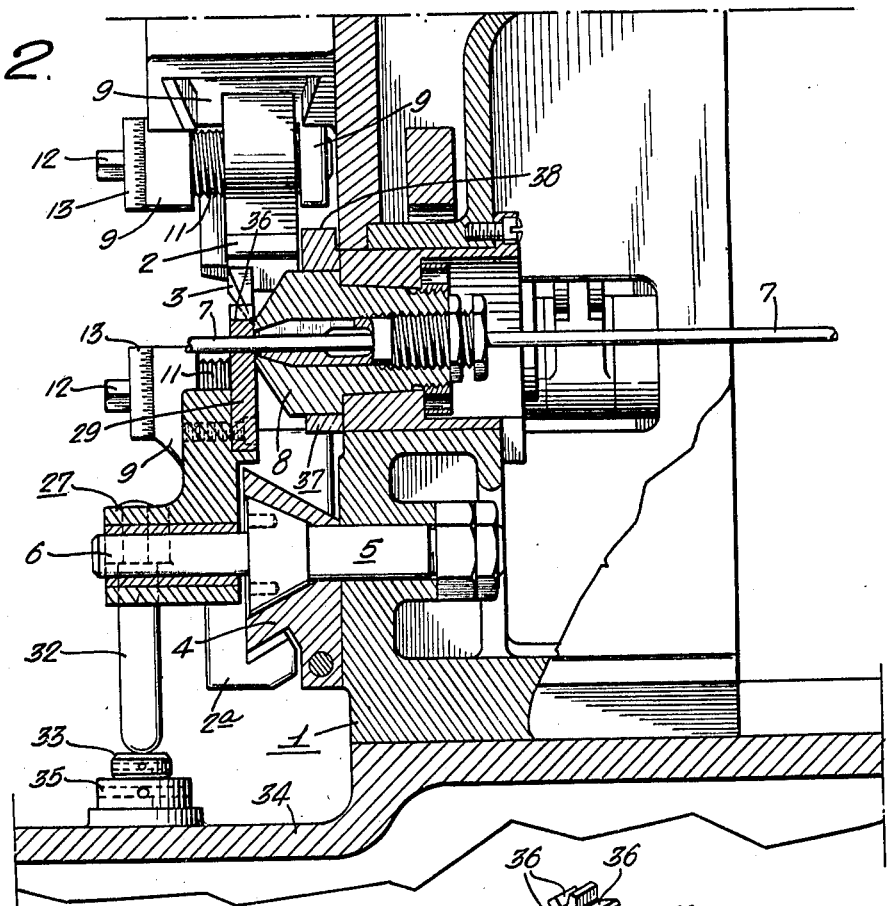
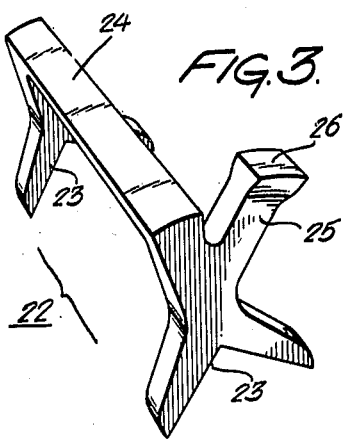
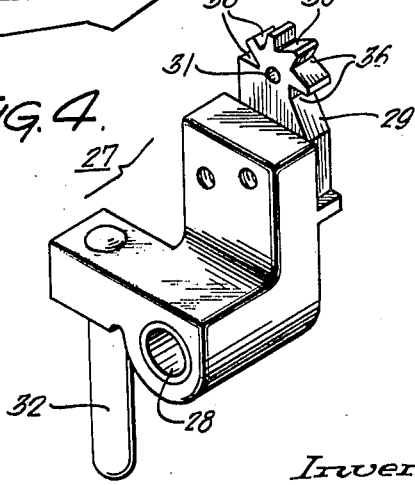

2,343,309

UNITED STATES PATENT OFFICE 2,343,309

SETTING GAUGE FOR CUTTING TOOLS

Nicholas P. Lloyd, Wynnewood, Pa.

Application December 18, 1942, Serial No. 469,482

7 Claims. (Cl. 82—34)

This invention relates to automatic machine tools of the type disclosed in my pending application for United States patent, Serial Number 383,634.

The principal object of the present invention is to provide a gauge device to facilitate and simplify the operation of setting up the machine for production of the various machine products.

More specifically, the object of the invention is to provide a gauge for facilitating the setting of the several tools of the automatic lathe disclosed in the aforesaid pending application, and the associated tool actuating mechanisms, so that each of the tools may perform its individual function in the machining operation with the required degree of precision.

The invention resides further in certain structural and mechanical details and combinations hereinafter described and illustrated in the attached drawings wherein:

Fig. 1 is a front elevational view, partly in section, of a portion of the tool support and the associated tool-actuating mechanisms.

Fig. 2 is a sectional view on the line 2—2 Fig. 1.

Figs. 3, 4 and 5 are views in perspective of the several elements of the gauge device.

As disclosed in my aforesaid pending application, the automatic lathe therein disclosed and in part illustrated in the drawings of the present application, comprises essentially a relatively fixed tool support and a rotary work spindle axially traversable with respect to the support; a plurality of tool carriers adjustably mounted on the support for reciprocation in paths substantially radially to the axis of the spindle; and a cam actuated mechanism for so reciprocating the carriers.

In the drawings, the tool support is indicated by the reference numeral 1. The tool carriers which are adjustably mounted on the support, as hereinafter described, are indicated by the reference numeral 2 and each of these carriers has mounted therein a cutting tool 3. The support 1 comprises a relatively movable section 4 which is mounted for oscillation upon a stud 5, see Fig. 2, and this section 4 carries two tool carriers, 2a, in each of which is mounted a tool 3a. The stud 5, as shown in Fig. 2, has an axial extension which projects forwardly, this projection functioning for a purpose hereinafter described.

The rotary work spindle of the machine is not illustrated in the present drawings, but a section of a work piece 7 carried in this spindle is shown projecting through a collet 8 mounted in the support 1, this collet providing the necessary support for the work in the immediate area within which the tools 3 and 3a operate.

The carriers 2 are pivotally supported upon holders 9 through the medium in each instance of a screw 11. The carrier has threaded engagement with the screw so that the latter constitutes not only a pivot upon which the carrier may be adjusted angularly in a plane at right angles to the axis of the work spindle, but also a means for adjusting the carrier on the holder in a direction parallel to said axis. Each of the screws 11 is provided with a terminal portion 12 forming a head by which the screw may be turned for adjustment of the carrier in the axial direction, and associated with the screw is a micrometer gauge 13 by means of which small measured angular movements of the screw are obtained. The holders 9 are slidingly mounted on the support 1 for reciprocation with respect to the spindle axis, and in this reciprocatory movement the carriers 2 and the tools 3 are moved in a direction substantially radial to the said axis.

The section 4 of the tool support, as previously set forth, is pivotally mounted upon the stud 5 and means is provided for oscillating this section so as to advance and retract the tools 3a with respect to the work and to the spindle axis. While the movement of the tools 3a in this case is an oscillatory one, the movement of the tools 3 with respect to the spindle axis is substantially a radial one.

Actuation of the carriers 2 and 2a to advance and retract the tools with respect to the work is effected through the medium of cams 14 and 15 which are carried by a cam shaft 16, this shaft in the present instance extending parallel to the axis of the work spindle. Each of the carriers 2 is connected through a suitable transmission (not shown) with a lever 17 carrying at its outer end a follower 18 associated with one or the other of the cams 14, there being a separate cam 14 for each of the said levers. Each of the transmission mechanisms associated with the levers 17 is preferably provided with adjustable means for varying the effective length of the transmission train between the cam 14 and the carrier 2. Such means is disclosed in my aforesaid copending application and takes the form of an adjusting screw (not shown in the present drawings) having an associated micrometer gauge for making small accurately measured adjustments. Each of the tools 3a may also be adjusted longitudinally in its carrier which will have the effect again of varying the effective length of the transmission; and a similar effect may also be obtained by adjusting follower 18 in the lever 17.

Oscillation of the member 4 is effected through the cam 15 and a through lever 19 at one end of the member 4 which carries a cam follower 21 for engagement with the cam surface. Means (not shown) is also provided in this instance for adjusting the effective length of the transmission between the carriers 2a and the cam 15.

For the fine and precise work for which this machine tool is adapted, it is essential that in setting up the machine for any particular piece of work the tool feeding mechanism must be adjusted with extreme accuracy. In order to facilitate this setting up operation and in accordance with the present invention, I provide a pair of gauge elements, illustrated respectively in Figures 3 and 4. These elements, cooperatively, afford a rapid and extremely accurate setting up of the mechanism as hereinafter described. The gauge element shown in Figure 3, designated by the reference numeral 22, is adapted for co-action with cam shaft 16 as illustrated in Figure 1 so as to establish the levers 17 and the cam followers 18 in positions from which the maximum displacement of the respective levers by the cams is limited to a known angle. The gauge element 22 has a similar function with respect to the lever 19 and the cam 15. Referring to Figures 1 and 3, it will be noted that the gauge element 22 has aligned crotches 23 which are adapted to fit against the shaft 16 as shown in Figure 1 and thereby establish the element in a predetermined position with respect to the shaft axis. The element 22 further comprises a longitudinal member 24, the outer surface of which is formed on the arc of a circle concentric with the axis of the shaft 16 when the crotches 23—23 are fitted to the shaft as described above. Under these conditions the curved outer surface of the member 24 will parallel the shaft. In operation this curved surface of the member 24 provides a support for the cam followers 18 of the levers 17 so that the cam engaging tips of the follower 18 and the levers 17 are established in a known position of radial displacement from the axis of the shaft 16. Since the major radii of the cams 14 are known, it is apparent that from the position in which the levers 17 are thus established through the gauge element 22, the cams are operative to further displace the followers 18 and the levers 17 from the axis of the shaft 16 to a known limited extent. It will be apparent also that by this means, the distance which the cams are capable of advancing the respective carriers toward the spindle axis from the retracted positions which the carriers occupy when the followers 18 engage the surface of the member 24 of the gauge element 22 is known. The gauge element 22 also comprises an arm 25, the outer curved surface 26 of which performs a corresponding function with respect to the lever 19, its follower 21 and the cam 15. This is illustrated in Figure 1.

The gauge device comprises a second element 27 shown in Figure 4. This element has a cylindrical bore 28 which is fitted neatly by the extension 6 of the stud 5 so that by applying the element 27 to the said extension, it is established adjustably in a predetermined position upon the support 1. The element 27 comprises also a part 29 which is adapted to be located in the paths of the tools 3 and 3a in their movements with the respective carriers. In order to establish this part 29 in a known fixed position with respect to the axis of the work spindle, said part is provided with an aperture 31 which is accurately sized with respect to a work piece or its equivalent, so as to neatly fit the latter. By passing the piece 7 from the collet 8 through the aperture 31, the said aperture is accurately centered with the axis of the spindle and the piece 7 functions temporarily to hold the element 27 in this position of angular adjustment on the supporting stud 6. In order to permanently establish the gauge element 27 in this operative position, the gauge element is provided with a depending arm 32 the lower end of which is adapted to rest upon the head of an adjustable screw 33 which is threaded into the base 34 of the support 1, the screw 33 being adjustable in the base to a position engaging the lower rounded end of the arm 32 when the gauge element 27 is in the proper operative position as described above. The screw may be locked in this position by means of a lock-nut 35. After adjustment of the screw 33 as described, the gauge piece 7 may be withdrawn from the gauge element without disturbing the position of the latter.

The part 29 of the gauge is provided with five recesses 36 arranged respectively for reception of the cutting ends of the tools 3 and 3a as shown in Figure 1. The gauge recesses 36 are arranged so as to afford not only an accurate setting of the cutting edges of the tools with respect to the surface of the work but also establishment of the tools in a known position of radial displacement from the axis of the spindle and of the work piece. The aforedescribed movement of the carriers through the action of the cams must then bring the cutting edges of the tools to a known position with respect to the said spindle axis. Adjustment of the tools 3 and 3a to the notches 36 of the element 27 may be effected in several ways, such, for example, as adjusting the tools themselves longitudinally in their respective carriers, adjustment of the followers 18 and 21 in the levers 17 and 19, or by otherwise adjusting the effective length of the transmission mechanism between the carriers 2 and 2a and the cams 14 and 15, as previously described. It will be apparent that by application of the cooperating gauge elements 22 and 27, it is possible to set the tool actuating mechanisms in a manner such that the position of furthest advancement of the cutting edges of the tools with respect to the axis of the work spindle or of the work itself may be accurately determined. By this means the depth of cut of the respective tools in the work may be accurately regulated.

As previously set forth, the adjustment of the tools 3 and 3a axially of the work spindle is effected through the medium of the pivot adjusting screws 11. In order to establish the tools 3 in a known position with respect to the work from which accurate adjustment of the tools in this axial direction may be made, I provide the gauge element 37 illustrated in Fig. 5. This element is in the form of an annulus having a bore which is adapted to neatly fit the outer cylindrical surface of the collet 8, as shown in Fig. 2. The element 37 is accurately machined on the side surfaces to a predetermined dimension and is provided with a radially projecting tongue 38 which in assembly is adapted to lie in line with one or the other of the carriers 2. The rear faces of the carriers are adjusted inwardly into positions in which they either engage or are predeterminedly spaced from the forward surface of the element 37 the cutting edges of the respective tools, 3, will be accurately positioned in the plane of the forward face of the collet 8. In other words, if the tools were fed inwardly against the work wheel in this position, the cut or one end of the cut would occur accurately in the plane of the collet face. From this position, adjustment of the carriers 2 required to bring the tools into predetermined position axially of the work may be effected through operation of the pivot screws 11. It is to be noted further that angular adjustments of the carriers 2 and 2a which may be required to bring the tips of the tools into accurate alignment with the surfaces of the notches 36 may be effected by angular adjustment of the carriers on the pivot screws 11.

I claim:

1. For automatic machine tools of the type comprising a relatively fixed tool support, a rotary work spindle axially traversable with respect to the support, a tool carrier adjustably mounted on the support for reciprocation in a path substantially radial to the axis of said spindle, and cam actuated mechanism for so reciprocating said carrier; a gauge comprising in combination, means for setting said mechanism to a position from which the cam is capable of advancing the carrier a known maximum distance toward the spindle axis, and a gauge element predeterminedly positionable with respect to said axis and in the path of the tool and providing for setting the tool independently of the first named setting to a position such that the aforesaid maximum advance movement of the carrier will bring the cutting edge of the tool to a known position with respect to the said axis.

2. For automatic machine tools of the type comprising a relatively fixed tool support, a rotary work spindle axially traversable with respect to the support, a tool carrier adjustably mounted on the support for reciprocation in a path substantially radial to the axis of said spindle, and cam actuated mechanism for so reciprocating said carrier; a gauge comprising in combination an element co-active with the cam shaft for setting the cam follower to a position from which a subsequent maximum displacement of the follower by the cam will effect a known movement of the carrier toward the spindle axis, and a second element pivotally mounted on the support, means for setting said element in a predetermined position of angular adjustment on the pivot wherein said element is located in the path of the tool for setting the latter independently of the first named setting to a position wherein the said known movement of carrier will bring the cutting edge of the tool to a predetermined position with respect to said axis, and adjustable means on the support for engaging the said second element to establish the element in said position of angular adjustment independently of the original setting means.

3. For automatic machine tools of the type comprising a relatively fixed tool support, a rotary work spindle axially traversable with respect to the support, a tool carrier adjustably mounted on the support for reciprocation in a path substantially radial to the axis of said spindle, and cam actuated mechanism for so reciprocating said carrier; a gauge comprising in combination means for setting said mechanism to a position from which the cam is capable of advancing the carrier a known maximum distance toward the spindle axis, means in said mechanism for adjusting the effective length of the transmission train, and a gauge element predeterminedly positionable with respect to the spindle axis and in the path of the tool and providing for setting the tool by adjusting means so that the aforesaid maximum advance movement of the carrier will bring the cutting edge of the tool to a known position with respect to the said axis.

4. For automatic machine tools of the type comprising a relatively fixed tool support, a rotary work spindle axially traversable with respect to the support, a tool carrier adjustably mounted on the support for reciprocation in a path substantially radial to the axis of said spindle, and cam actuated mechanism for so reciprocating said carrier; a gauge comprising in combination means for setting said mechanism to a position from which the cam is capable of advancing the carrier a known maximum distance toward the spindle axis, a gauge element predeterminedly positionable with respect to said axis and in the path of the tool for setting of the tool independently of the first named setting to a position such that the aforesaid maximum advance movement of the carrier will bring the cutting edge of the tool to a known position with respect to the said axis, and means supported in axial alignment with the spindle for so predeterminedly positioning said gauge element.

5. For automatic machine tools of the type comprising a tool support and a rotary work spindle axially traversable with respect to the support, said support being oscillatable upon a relatively fixed pivot in a plane at right angles to the axis of said spindle, a tool carrier adjustably mounted on the support for oscillation with the latter with respect to the axis of the spindle, and cam actuated mechanism for oscillating said support; a gauge comprising in combination means for setting said mechanism to a position from which the cam is capable of advancing the carrier by oscillation of the support a known maximum distance toward the spindle axis, and a gauge element adjustably mounted on said pivot and in the path of the tool for setting to a position wherein the aforesaid known movement of the carrier will bring the cutting edge of the tool to a known position with respect to the said axis.

6. For automatic machine tools of the type comprising a relatively fixed tool support, a rotary work spindle axially traversable with respect to the support, a tool carrier adjustably mounted on the support for reciprocation in a path substantially radial to the axis of said spindle, and cam actuated mechanism for so reciprocating said carrier; a gauge comprising in combination an element co-active with the cam shaft for setting the cam follower to a position from which a subsequent maximum displacement of the follower by the cam will effect a known movement of the carrier toward the spindle axis, and a second element predeterminedly positionable with respect to said axis by means of which the tool may be set independently of the first setting to a position wherein the said known movement of the carrier will bring the cutting edge of the tool to a known position with respect to the said axis.

7. In an automatic machine tool, the combination with a relatively fixed tool support, of a rotary work spindle axially traversable with respect to said support, a work-supporting collet mounted in the support in alignment with the spindle, a tool carrier mounted on the support for reciprocation in a path substantially radial to the spindle axis, means for adjusting the carrier on the support in direction parallel to said axis, and means on the collet and coactive with the carrier for gauging the position of the tool with respect to the collet.

NICHOLAS P. LLOYD.